(12) United States Patent
Boiocchi et al.

(10) Patent No.: US 8,931,532 B2
(45) Date of Patent: Jan. 13, 2015

(54) RAIN TYRE

(75) Inventors: Maurizio Boiocchi, Milan (IT);
Giuseppe Matrascia, Milan (IT); Vito Bello, Milan (IT)

(73) Assignee: Pirelli Tyre, S.p.A., Milan (IT)

( * ) Notice: Subject to any disclaimer, the term of this patent is extended or adjusted under 35 U.S.C. 154(b) by 1050 days.

(21) Appl. No.: 13/001,915

(22) PCT Filed: Jun. 30, 2008

(86) PCT No.: PCT/IT2008/000442
§ 371 (c)(1),
(2), (4) Date: Dec. 29, 2010

(87) PCT Pub. No.: WO2010/001421
PCT Pub. Date: Jan. 7, 2010

(65) Prior Publication Data
US 2011/0108175 A1 May 12, 2011

(51) Int. Cl.
*B60C 11/13* (2006.01)
*B60C 11/03* (2006.01)

(52) U.S. Cl.
CPC ..... *B60C 11/0302* (2013.04); *B60C 2011/0383* (2013.04); *B60C 2011/0374* (2013.04)
USPC ................ 152/209.18; 152/209.2; 152/209.3; 152/209.16; 152/209.28

(58) Field of Classification Search
CPC B60C 11/0302; B60C 11/03; B60C 11/0304; B60C 11/0306; B60C 11/0318; B60C 11/13; B60C 11/0309; B60C 2011/0339; B60C 2011/0358; B60C 2011/0365; B60C 2011/0372; B60C 2011/0381; B60C 2011/0383
USPC ................ 162/209.18, 209.2, 209.3, 209.28, 162/209.16, 209.8, 209.9, 209.1; D12/525–532, 557–567, 592–603
See application file for complete search history.

(56) References Cited

U.S. PATENT DOCUMENTS 5,178,698 A * 1/1993 Shibata ...................... 152/209.3
5,628,843 A * 5/1997 Hanya ........................ 152/209.3

(Continued)

FOREIGN PATENT DOCUMENTS

EP 1 752 314 A1 2/2007
JP 08-034212 2/1996
WO WO 2006/056238 A1 6/2006

(Continued)

OTHER PUBLICATIONS

International Search Report from the European Patent Office for International Application No. PCT/IT2008/000442, mailing date Oct. 31, 2008.

*Primary Examiner* — Eric Hug
(74) *Attorney, Agent, or Firm* — Finnegan, Henderson, Farabow, Garrett & Dunner, L.L.P.

(57) ABSTRACT

A tire includes a tread band provided with a tread pattern including a first and a second portion of tread pattern, repeated just the same along the circumferential extent of the tire, forming respectively a short pitch module and a long pitch module of the tread pattern, wherein the modules include a respective first transverse groove in which, starting from an axially outer first end thereof toward an opposed axially inner second end thereof, an initial section and a section of enlarged cross-section are formed, the latter being blind, at least on its axially inner side, when in the footprint area. The initial section and the section of enlarged cross-section have, respectively, a first width and a second width, and the ratio between the second width and the first width of a first transverse groove belonging to a short pitch module is greater than the ratio between the second width and the first width of a first transverse groove belonging to a long pitch module.

35 Claims, 2 Drawing Sheets

(56) References Cited

U.S. PATENT DOCUMENTS

| | | |
|---|---|---|
| 5,924,464 A | 7/1999 | White |
| 8,210,220 B2 * | 7/2012 | Nagai et al. ............. 152/209.3 |
| 2003/0111149 A1 * | 6/2003 | Caretta et al. ............. 152/209.1 |
| 2009/0165908 A1 * | 7/2009 | Takahashi et al. ....... 152/209.18 |

FOREIGN PATENT DOCUMENTS

WO  WO 2007/114430  * 10/2007

* cited by examiner

RAIN TYRE

CROSS REFERENCE TO RELATED APPLICATION

This application is a national phase application based on PCT/IT2008/000442, filed Jun. 30, 2008, the content of which is incorporated herein by reference.

BACKGROUND OF THE INVENTION

1. Field of the Invention

The present invention relates to a rain tyre equipped with a tread pattern particularly configured to improve the holding of the tyre on a wet roadbed. Even more particularly, the tread pattern is configured to improve the holding of the tyre when cornering on a wet roadbed.

2. Description of the Related Art

It is known that a vehicle driven on a road with a wet roadbed is subject, in particular conditions, to the phenomenon of aquaplaning. This phenomenon involves a substantial loss of adherence of the tyre, with obvious serious consequences for the safety of the vehicle which, in fact, proves to be out of control in this phase.

The phenomenon of aquaplaning is substantially attributable to the lifting up of the tyre from the surface of the road as a result of the hydrostatic pressure exerted by the film of water present on the roadbed. This pressure arises from the impact of the water against the advancing tyre, and is directly linked to the speed of the vehicle: as soon as this pressure equals the ground contact pressure of the tyre, the latter is in fact partially lifted from the ground, thus reducing its bearing surface on the road, and consequently losing adherence to the terrain.

In order to limit the occurrence of the phenomenon, one or more grooves are typically provided on the tread band of tyres, generally extending over the circumferential extent of the tyre.

The main function of these grooves is that of defining, on the front of the advancing tyre, one or more passages for the water. In this way, at least a fraction of the water affected by the advance of the tyre does not impact directly on its surface, reducing the overall hydrostatic pressure exerted on the tyre.

Besides the above-mentioned circumferential grooves, there are, typically, transverse grooves present on the tread pattern, extending from one of its lateral shoulders towards an equatorial zone of the tyre. A principal function of these grooves is that of permitting the rapid discharge of the water towards the outside of the zone of contact between tyre and roadbed, known in the field and identified hereinafter as "footprint area".

A further important factor in the dynamics of the triggering of the phenomenon of aquaplaning is provided by the mutual connections between the various grooves. Such connections, in fact, although on the one hand they increase the volume of voids, on the other hand, actually in the footprint area, they cause turbulence and eddies to occur at the zones where different grooves meet, which slow down the flow of water through the grooves, locally increasing the hydrostatic pressure on the tyre.

It is pointed out that, in the present context, an end or a portion of groove is generally defined as "blind", when it is not in connection with other grooves adjacent thereto. In particular, two grooves are defined as "not in connection" with one another when the passage of water from one to the other is substantially impeded. It should be noted, however, that the aforesaid definition does not exclude the possibility that the portion of groove may be open at the outer lateral edge of the tread band. Moreover, an end or a portion of groove may, in general, prove to be only partially blind, for example only on the axially outer side or on the axially inner side. In this case, the end or the portion of groove will prove to be not in connection with grooves adjacent thereto on the axially outer side or, respectively, on the axially inner side.

In the present context, it is stated that by "module" of the tread pattern there is to be understood a portion of tread pattern repeated, just the same, in succession along the entire circumferential extent of the tread band itself. The modules, however, while maintaining the same pattern configuration, have generally different circumferential lengths. This technical stratagem becomes necessary in order to limit the noise and vibrations of the rolling tyre, by distributing the characteristic frequencies over a wider spectrum.

More precisely, in this description and in the following claims, a "long pitch" module and a "short pitch" module are defined, in which the long pitch module has a circumferential dimension at least 20% greater than the corresponding circumferential dimension of the short pitch module.

The long pitch and short pitch modules are generally disposed circumferentially in succession, one after the other, in a sequence of long pitch and short pitch modules suitably designed to obtain the desired effect of noise limitation. It is further possible to provide modules formed of a combination of short pitch and long pitch sub-modules, thus increasing the number of possible combinations. By way of example, by combining a short pitch sub-module with a long pitch sub-module it is possible to obtain four different kinds of modules: a first formed by two short pitch sub-modules, a second formed by one short pitch sub-module and one long pitch sub-module, a third formed by one long pitch sub-module and one short pitch sub-module, and a fourth formed by two long pitch sub-modules.

For this reason, in the present context, the term "short pitch module" or "long pitch module" is to be regarded as referring, in a completely analogous manner, both to the module in the strict sense, when this is not formed by sub-modules or, in the opposite case, to the individual sub-modules which form it.

A further parameter used in the technical field of reference for the quantitative evaluation of the presence of grooves in the tread pattern is the "void-solid" ratio, a non-dimensional number defined as the ratio between the tread surface area having grooves and notches, and therefore not bearing on the roadbed, and the total surface area of the tread. This parameter may be evaluated both on the entire tread and on a specific portion thereof.

EP 1752314, among its different exemplary embodiments, shows a tyre having a tread band on which is defined a tread pattern comprising a main circumferential groove, extending along an equatorial plane of the tyre, and also a plurality of transverse grooves extending from the respective opposed shoulders of the tyre towards the main circumferential groove, wherein the axially inner end section of each transverse groove is blind, when in the footprint area.

U.S. Pat. No. 5,924,464 shows a tyre on the tread band of which is defined a tread pattern comprising a plurality of main grooves extending circumferentially around the tyre, and also a plurality of transverse grooves extending between the main grooves, wherein each transverse groove comprises a portion having an enlarged cross-section, connected to the adjacent main grooves via respective connecting passages which are partly or completely reclosable, when in the footprint area.

SUMMARY OF THE INVENTION

The Applicant has verified that the number and dimensions of the grooves, circumferential or transverse, cannot be increased at will. In fact, an excessive number and/or dimensions of grooves result in a consequent limitation of the bearing surface of the tyre on the ground, penalising both its capacity for grip on the roadbed and its resistance to wear.

In order to adapt to the aforesaid requirements, it is therefore necessary to optimise the presence and the dimensions of the grooves in the tread pattern.

The Applicant has moreover observed that the dimensions of the grooves do not normally remain constant along the circumferential extent of the tread pattern.

More precisely, the Applicant has observed that the dimensions of the grooves, and in particular the width thereof, in a short pitch module or sub-module are less, compared with the corresponding dimensions of the similar grooves in a long pitch module.

It is pointed out that by "width" of a groove, there is to be understood in this context the distance, measured on the right-angled cross-section of the groove, between the edges by which it is delimited.

In particular, the Applicant has verified that the ratio between the respective widths of corresponding transverse grooves provided on a long pitch module and on a short pitch module depends on the ratio between the circumferential dimensions of the long pitch module and the short pitch module.

Even more particularly, the Applicant has verified that, in the sections of the transverse grooves substantially parallel to an axial direction of the tyre, these ratios are substantially equal.

The Applicant has therefore concluded that by acting in a differentiated manner on the widths of the transverse grooves provided respectively in a short pitch module and in a long pitch module it would be possible to increase performance in terms of aquaplaning of the tyre without significantly penalising the performance thereof in terms of grip and wear.

Proceeding on the basis of this first insight, the Applicant then found that by providing on a transverse groove of each module an initial section and a section of enlarged cross-section, which is blind on its axially inner side when in the footprint area, wherein the ratio between the width of the section of enlarged cross-section and the width of the initial section of a transverse groove provided in a short pitch module is greater than the corresponding ratio between the width of the section of enlarged cross-section and the width of the initial section of a corresponding transverse groove provided in a long pitch module, the tyre exhibits a substantial increase in performance in terms of aquaplaning, while maintaining high properties of grip and resistance to wear.

In particular, in a first aspect the invention relates to a tyre including a tread band provided with a tread pattern comprising:
 a first portion of tread pattern, repeated just the same along the circumferential extent of said tyre, forming a short pitch module of said tread pattern, and also
 a second portion of tread pattern, repeated just the same along the circumferential extent of said tyre in suitable succession to said first portion, forming a long pitch module of said tread pattern,
said long pitch module having the same geometric configuration as said short pitch module, both said modules, short pitch and long pitch, comprising a respective first transverse groove in which, starting from an axially outer first end thereof towards an opposed axially inner second end thereof, a first initial section and a section of enlarged cross-section are formed, said section of enlarged cross-section being blind, on its axially inner side, at least when in the footprint area, said initial section and section of enlarged cross-section having respectively a first width and a second width, wherein the ratio between said second width and said first width of said transverse groove of said short pitch module is greater than the ratio between said second width and said first width of said transverse groove of said long pitch module.

The Applicant has verified that the sections of enlarged cross-section may advantageously function as "basins" for the containment of water present in the footprint area, capable of containing a greater volume of liquid before it can interact with the bottom of the groove and increase the hydrostatic pressure exerted on the tyre.

In particular, these containment basins are relatively wider in the short pitch modules compared with those provided in the long pitch modules.

The present invention, in the aforesaid aspect, may have at least one of the preferred characteristics indicated hereinafter.

Preferably, said second width is greater than a third width of a section adjacent to said section of enlarged cross-section.

In a first form of embodiment, said initial section coincides with said section adjacent to said section of enlarged cross-section.

In a second form of embodiment, said first transverse groove comprises an auxiliary section, having said third width.

Preferably, said auxiliary section is interposed between said initial section and said section of enlarged cross-section.

It is furthermore preferred that said third width is less than said first width.

The provision of an auxiliary section of reduced width makes it possible to define more precisely the section of enlarged cross-section and to concentrate therein the function of containment of the water which may be present on the roadbed.

Preferably, said initial section is open, at said first end of said first transverse groove, on a shoulder of said tyre.

In this way, the water present in an axially outer section of the first transverse groove can flow away rapidly towards the outside of the tyre.

Moreover, it is particularly preferred that said section of enlarged cross-section is adjacent to said second end of said first transverse groove. By this expedient, the result obtained is that the effect of containment of the water is advantageously obtained in an axially inner zone of the tyre, from which the outflow towards the outside of the tyre proves to be much more difficult.

In a preferred first form, said ratio between said second width and said first width of said first transverse groove of said short pitch module is between about 1 and about 1.5.

More preferably, said ratio between said second width and said first width of said first transverse groove of said short pitch module is between about 1.2 and about 1.3.

Preferably, moreover, said ratio between said second width and said first width of said transverse groove of said long pitch module is between about 0.8 and about 1.2.

In a preferred form of the present invention, said short pitch module and said long pitch module comprise respective portions of at least one circumferential groove provided on said tread band.

Much more preferably, said second end of said first transverse groove is close to said circumferential groove.

In this way, the result obtained is that the part of the water axially outside the circumferential groove is affected by the first transverse groove and in particular by its section of enlarged cross-section.

Preferably, said second end is connected to said circumferential groove via a groove with lowered profile, such as to flatten itself substantially completely when in the footprint area.

The groove with lowered profile allows the passage of water between the circumferential groove and the first transverse groove when outside the footprint area. However, when in the footprint area, the groove with lowered profile is deformed by the load to which it is subjected, so that the bottom of the groove becomes substantially coplanar with the radially outer surface of the tread band which surrounds it, therefore substantially impeding the passage of water between the circumferential groove and the first transverse groove.

Preferably, said section of enlarged cross-section is connected to said groove with lowered profile by means of an inclined ramp.

In a preferred version, said initial section, at said first end of said first transverse groove, has a first inclination with respect to an axial direction of said tread pattern, and said section of enlarged cross-section has a second inclination with respect to said axial direction, said second inclination being greater than said first inclination.

More preferably, said first inclination is between about 0° and about 25°.

More preferably, said second inclination is between about 45° and about 90°.

Even more preferably, said second inclination is between about 60° and about 80°.

According to a preferred characteristic of the present invention, said initial section comprises a straight portion at said first end, and a curved portion adjacent to said section of enlarged cross-section or to an auxiliary section of said first transverse groove.

Preferably, moreover, said auxiliary section is interposed between said initial section and said section of enlarged cross-section.

It is furthermore preferred that said straight portion has said first inclination.

Much more preferably, said curved portion of said initial section extends in connection between said straight portion of said initial section and said section of enlarged cross-section or said auxiliary section.

In this way, abrupt variations in the direction of the first transverse groove are avoided, so as to facilitate the outflow of the water towards the outside of the tyre.

According to a further preferred characteristic of the present invention, each of said short pitch module and said long pitch module comprises a second transverse groove extending substantially parallel to, and spaced from, said first transverse grove.

Preferably, said first and said second transverse groove delimit a first shoulder block of said short pitch module and said long pitch module.

Much more preferably, said first and said second transverse groove delimit, at least partially, an elongate raised portion, adjacent to said first shoulder block.

Preferably, moreover, said elongate raised portion extends substantially in a direction parallel to said section of enlarged cross-section.

More preferably, said elongate raised portion comprises a plurality of intermediate consecutive blocks substantially aligned with one another.

Much more preferably, said intermediate blocks are separated by auxiliary transverse grooves.

In a further preferred characteristic thereof, each of said short pitch module and said long pitch module comprises a second shoulder block, circumferentially aligned with said first shoulder block.

Preferably, said second shoulder block of each short pitch or long pitch module is delimited by said second transverse groove and by a first transverse groove of an adjacent short pitch or long pitch module.

In a preferred form of embodiment of the present invention, each of said short pitch module and said long pitch module comprises a first sub-module including said first shoulder block and said first transverse groove.

More preferably, each of said short pitch module and said long pitch module comprises a second sub-module including said second shoulder block and said second transverse groove.

Much more preferably, said first and said second sub-module have respective circumferential dimensions selected, independently of one another, from a measurement of short pitch and a measurement of long pitch.

According to a preferred characteristic, the void-solid ratio of said short pitch module is substantially identical to the void-solid ratio of said long pitch module.

In this way, a homogeneous distribution of the grooves is maintained in the different modules which constitute the tread pattern, therefore ensuring homogeneous behaviour of the tyre.

According to a further preferred characteristic, said section of enlarged cross-section is blind, at least when in the footprint area, also on the axially outer side.

BRIEF DESCRIPTION OF THE DRAWINGS

The characteristics and advantages of the invention will become clearer from the detailed description of a preferred exemplary embodiment thereof, provided by way of non-limiting example with reference to the appended drawings, in which.

DETAILED DESCRIPTION OF THE INVENTION

With reference to the appended drawings, the reference 1 indicates as a whole a tyre produced according to the present invention.

The tyre 1 comprises a tyre structure, conventional per se and not shown in the appended drawings, and also a tread band 2, disposed in a radially outer position on the tyre and arranged to come into contact with the roadbed on which the tyre 1 is intended to roll.

On the tread band 2 a tread pattern 3 is defined which is formed as a whole by the successive repetition along the circumferential extent X of the tyre of specific portions of tread pattern, each of which extends over the entire axial extent Y of the tread band 2.

Figure 1:
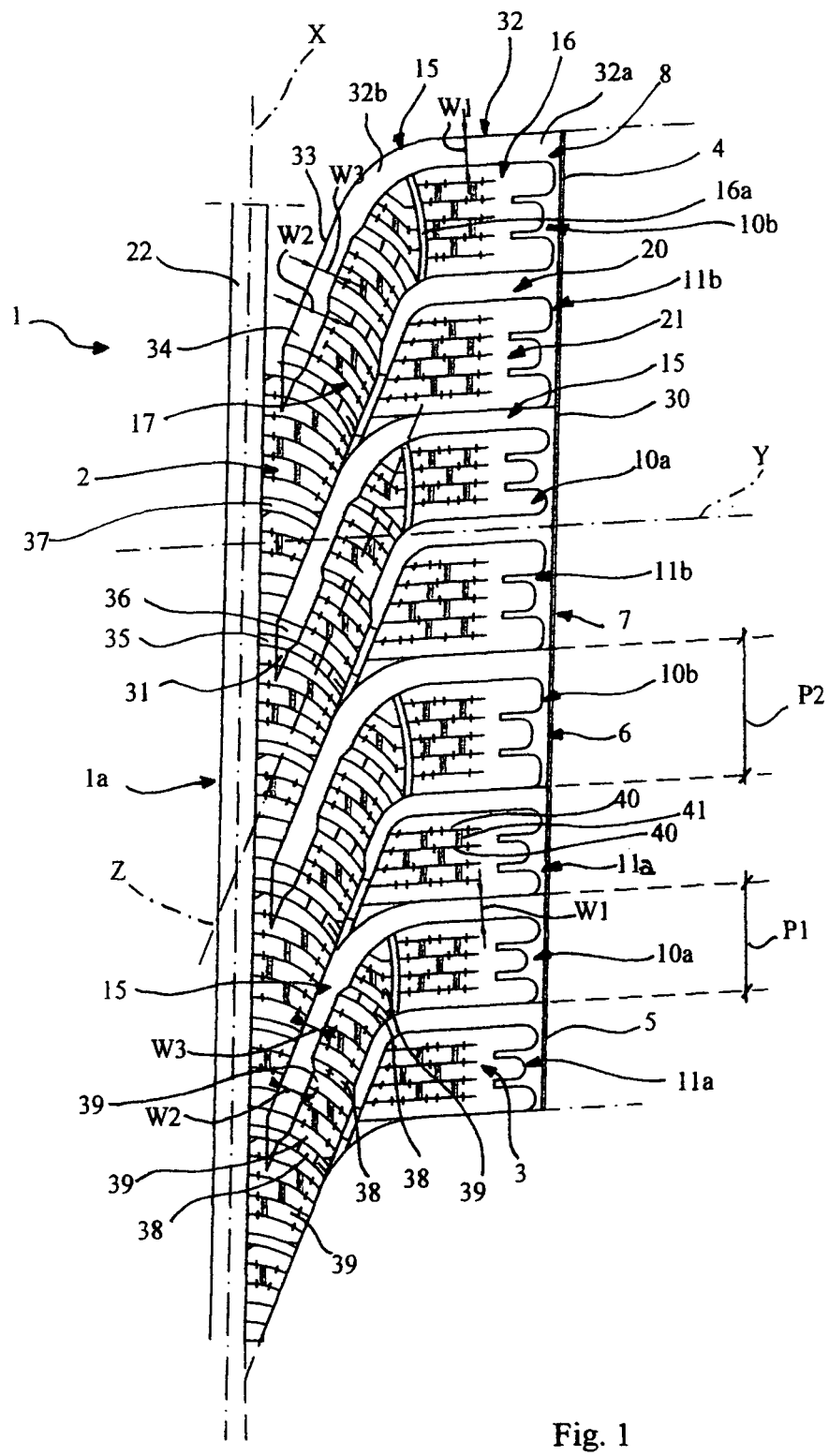
FIG. 1 is a diagrammatic view of the course on one plane of a significant region of tread band of a tyre produced according to the present invention.
Figure 2:
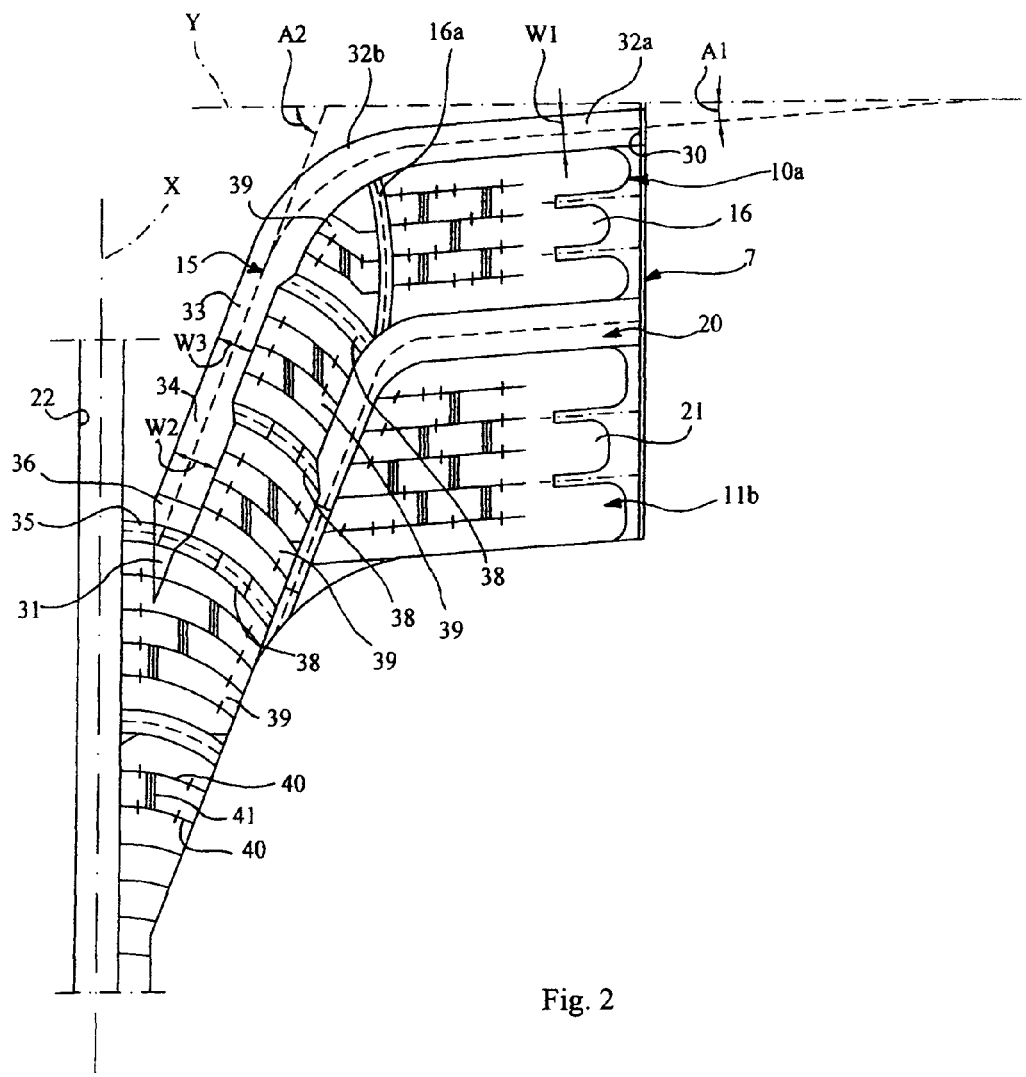
FIG. 2 is a view on an enlarged scale of a portion of the tread band region of FIG. 1.

For the sake of simplicity of the drawing, FIG. 1 shows only one region 1a representing the tread band 2, which extends from a shoulder 4 of the tyre 1 towards an equatorial plane of the tyre 1, not shown. The remaining part of the tread band, which completes in the axial direction Y the tread pattern region 1a, may be configured in any convenient manner, for example by carrying over symmetrically the configuration of the region 1a or by arranging in a desired manner a differently ordered plurality of blocks and/or grooves.

The aforesaid portions of tread pattern form respective modules of the tread pattern 3, which, while having substantially identical geometric configurations, have circumferential and/or axial measurements, both overall and partial, that are generally different, as described in greater detail hereinafter.

In the preferred exemplary embodiment described herein, the tread pattern 3 comprises four different modules, indicated respectively in FIG. 1 by 5, 6, 7 and 8.

Each of the modules from 5 to 8 is formed by a first and a second sub-module, each of which, in their turn, has dimensions selected, independently of one another, from a measurement of short pitch and a measurement of long pitch.

In this way, a first short pitch sub-module 10a and a first long pitch sub-module 10b are formed, configured substantially identically to each other but with different dimensions. In particular, the ratio between the circumferential dimension P1, measured at the shoulder 4, of the first long pitch sub-module and the corresponding circumferential dimension P2 of the first short pitch sub-module, in one of the preferred embodiment solutions, is about 1.3.

Similarly, on the tread pattern 3 a second short pitch sub-module 11a and a second long pitch sub-module 11b are formed, configured substantially identically to each other, but with different dimensions. In particular, it is preferred that the circumferential dimensions of the second sub-modules 11a, 11b, measured at the shoulder 4, are substantially identical, respectively, to the circumferential dimension of the first short pitch sub-module 10a and of the first long pitch sub-module 10b.

The modules from 5 to 8 are formed by the different possible combinations of the first and second sub-modules. In the form of embodiment illustrated in FIG. 1, the module 5 is formed by a first short pitch sub-module 10a and by a second short pitch sub-module 11a, the module 6 is formed by a first long pitch sub-module 10b and by a second short pitch sub-module 11a, the module 7 is formed by a first short pitch sub-module 10a and by a second long pitch sub-module 11b, the module 8 is formed by a first long pitch sub-module 10b and by a second long pitch sub-module 11b.

The module 5, formed by two short pitch sub-modules, can be identified as a short pitch module, the modules 6 and 7, formed by a short pitch sub-module and a long pitch sub-module, and also disposed in reverse order, can be identified as intermediate pitch modules, while the module 8, formed by two long pitch sub-modules, can be identified as a long pitch module.

In FIG. 1, for the sake of clarity of the drawing, the modules from 5 to 8 are carried over one after the other; however, such modules will be carried over in the tread pattern 3 in the sequence considered most suitable for the purpose of limiting the noise of the tyre as much as possible.

Each first sub-module 10a, 10b, comprises a first transverse groove 15, a first shoulder block 16 and an elongate raised portion 17, disposed consecutively to the first shoulder block 16 and distinguished therefrom by a separation groove 16a, so as to define, in combination with the shoulder block 16, a first edge of the first transverse groove 15.

Each second sub-module 11a, 11b itself comprises, at the shoulder 4, a second transverse groove 20 and a second shoulder block 21 adjacent to the second transverse groove 20.

First and second sub-modules are always disposed alternately in succession in the circumferential direction X, so that at the shoulder 4, the same sequence is repeatedly formed, composed of: first transverse groove 15, first shoulder block 16, second transverse groove 20 and second shoulder block 21.

Owing to this configuration, the first shoulder block 16 is delimited, in the circumferential direction, by the first transverse groove 15 and by the second transverse groove 20 of the same module, while the second shoulder block 21 is delimited, in the circumferential direction, by the second transverse groove 20 of the same module and by the first transverse groove 15 of an adjacent module.

The tread pattern 3 further comprises a circumferential groove 22, extending parallel to the equatorial plane of the tyre, and passing through all the modules 5-8.

Although only one circumferential groove is shown in the appended drawings, two or more of these may be provided on the tread pattern 3.

The first transverse groove 15 extends starting from an axially outer first end 30 thereof, open at the shoulder 4, towards an opposed axially inner second end 31 thereof, disposed in proximity to the circumferential groove 22.

The first transverse groove 15 and the second 20, and also the circumferential groove 22, have a depth of between 5 mm and 10 mm, for example 8.5 mm.

Defined on the first transverse groove 15 are an initial section 32, comprising the first end 30, an auxiliary section 33, consecutive and adjacent to the initial section 32, and also a section of enlarged cross-section 34, extending consecutively to the auxiliary section 33 on the opposite side from the initial section 32, to close to the second end 31 of the first transverse groove 15.

In the preferred example described herein, the auxiliary section 33 is interposed between the initial section 32 and the section of enlarged cross-section 34; however, in an alternative embodiment of the present invention provision is made for the section of enlarged cross-section 34 to be interposed between the initial section 32 and the auxiliary section 33.

The initial section 32, the section of enlarged cross-section 34 and the auxiliary section 33 have, respectively, a first width W1, a second width W2 and a third width W3.

The measurement of the widths W1, W2 and W3 is generally between about 4 mm and about 10 mm and depends on whether the first transverse groove 15 belongs to a first short pitch sub-module 10a or, alternatively, to a first long pitch sub-module 10b.

In particular, according to the present invention, provision is made for the ratio between the second width W2 of the section of enlarged cross-section 34, and the first width W1 of the initial section 32 of a first transverse groove 15 belonging to a first short pitch sub-module 10a, to be greater than the corresponding ratio between the second width W2 and the first width W1 of a first transverse groove 15 belonging to a first long pitch sub-module 10b.

Preferably, the ratio between the second width W2 and the first width W1 of a first transverse groove 15 belonging to a first short pitch sub-module 10a is between about 1 and about 1.5, more preferably between about 1.2 and about 1.3, and much more preferably is about 1.25.

Preferably, the ratio between the second width W2 and the first width W1 of a first transverse groove 15 belonging to a first long pitch sub-module 10b is between about 0.8 and about 1.2 and much more preferably about 1.

The third width W3 is preferably less than both the first width W1 and the second width W2.

By varying the relative ratio between the widths W2 and W1 of the first transverse groove 15, the dimensions of the remaining grooves present on the first and second sub-modules are selected so that the void-solid ratio of each first and second sub-module, whether short pitch or long pitch, remains substantially constant.

The second end 31 of the first transverse groove 15 is connected to the circumferential groove 22 via a groove with lowered profile 35, having a sufficiently reduced depth, for example about 2 mm, to impede the passage of fluid between the circumferential groove 22 and the first transverse groove 15, when in the footprint area. It will be noted that under these conditions, in fact, with the tyre being subjected to the load of the vehicle, the not very deep grooves tend to "flatten out", disappearing in fact. Therefore, in spite of the presence of the groove with lowered profile 35, the first transverse groove 15 cannot be kept in connection with the circumferential groove 22 when in the footprint area.

The section of enlarged cross-section 34 is connected to the groove with lowered profile 35 by means of an inclined ramp 36, extending between the respective bottoms of the first transverse groove 15 and the groove with lowered profile 35.

Between the circumferential groove 22 and the first transverse groove 15 there extends a further groove with lowered profile 37, for which the same considerations just mentioned apply.

The first transverse groove 15, and in particular the section of enlarged cross-section 34, is therefore blind on its axially inner side, towards the circumferential groove 22 when in the footprint area.

Between the first transverse groove 15 and the second transverse groove 20 extend auxiliary transverse grooves, all indicated by 38, traversing the elongate raised portion 17 and defining thereon a plurality of intermediate blocks 39 consecutive with one another and substantially aligned in a direction Z substantially parallel to the length of the section of enlarged cross-section 34 and of the auxiliary section 33.

The auxiliary transverse grooves 38 may or may not have a reduced depth. In the case where all said auxiliary transverse grooves 38 have a reduced depth, the first transverse groove 15 is blind with respect to the second transverse groove 20 when in the footprint area.

The first transverse groove 15 and the second transverse groove 20 have a generally curved shape, and extend substantially parallel to each other.

In particular, the initial section 32, at the first end 30 of the first transverse groove 15, has a straight portion 32a, having a first inclination A1 with respect to the axial direction Y, and a curved portion 32b extending from the axially inner side with respect to the straight portion 32a, to connect the initial section 32 to the auxiliary section 33. The latter extends, in alignment with the section of enlarged cross-section 34, in a substantially rectilinear direction, having a second inclination A2 with respect to the axial direction Y.

The first inclination A1 is less than the second inclination A2, and preferably the first inclination is between about 0° and about 25°, while the second inclination is between about 45° and about 90°, more preferably between about 60° and about 80°.

Much more preferably, the first inclination A1 is about 5° and the second inclination A2 is about 70°.

Preferably, both the shoulder blocks 16, 21 and the elongate raised portion 17 are intersected by respective pluralities of notches 40 substantially parallel to one another, which have a width of not more than about 1 mm and a depth of between about 1.5 mm and about 9.5 mm.

Between adjacent notches 40, reinforcing slots 41 may be provided.

The Applicant has subjected a tyre produced according to the invention to a series of tests in order to check its performance in relation to the phenomenon of aquaplaning, particularly during cornering.

In particular, these tests provide for a vehicle on which the tyres to be tested are fitted to travel round a curve of constant radius, for example of 100 meters, wherein its final section, for example the last 20 meters, is covered with a layer of water having a constant depth, for example 7 mm. The vehicle travels round the curve at constant speed and repeats the test at increasing speeds in order to determine the limit velocity beyond which the vehicle loses adherence owing to aquaplaning.

The speed and maximum acceleration were then calculated and compared with speed and maximum acceleration obtained with the same vehicle fitted with tyres that were similar but devoid of the particular feature of the present invention.

The tests confirmed a net improvement in the aquaplaning behaviour during cornering of the tyre produced according to the invention, quantified by a increase in the maximum speed and maximum acceleration of about 25%.

At the same time, the wear on the tyre and its grip remained substantially unchanged.

The invention claimed is:

1. A tyre comprising a tread band provided with a tread pattern comprising:
    a first portion of tread pattern, repeated the same along a circumferential extent of said tyre, forming a short pitch module of said tread pattern, and
    a second portion of tread pattern, repeated the same along the circumferential extent of said tyre in succession to said first portion, forming a long pitch module of said tread pattern,
said long pitch module having a same geometric configuration as said short pitch module, both said modules, short pitch and long pitch, comprising a respective first transverse groove wherein, starting from an axially outer first end thereof toward an opposed axially inner second end thereof, a first initial section and a section of enlarged cross-section are formed, said section of enlarged cross-section being blind, at least on an axially inner side thereof, at least when in a footprint area, said initial section and said section of enlarged cross-section having, respectively, a first width and a second width, wherein a ratio between said second width and said first width of said first transverse groove of said short pitch module is greater than a ratio between said second width and said first width of said first transverse groove of said long pitch module.

2. The tyre according to claim 1, wherein said second width is greater than a third width of a section adjacent to said section of enlarged cross-section.

3. The tyre according to claim 2, wherein said initial section coincides with said section adjacent to said section of enlarged cross-section.

4. The tyre according to claim 2, wherein said first transverse groove comprises an auxiliary section having said third width.

5. The tyre according to claim 4, wherein said auxiliary section is interposed between said initial section and said section of enlarged cross-section.

6. The tyre according to claim 2, wherein said third width is less than said first width.

7. The tyre according to claim 1, wherein said initial section is open at said first end of said first transverse groove on a shoulder of said tyre.

8. The tyre according to claim 1, wherein said section of enlarged cross-section is adjacent to said second end of said first transverse groove.

9. The tyre according to claim 1, wherein said ratio between said second width and said first width of said first transverse groove of said short pitch module is between about 1 and about 1.5.

10. The tyre according to claim 1, wherein said ratio between said second width and said first width of said first transverse groove of said short pitch module is between about 1.2 and about 1.3.

11. The tyre according to claim 1, wherein said ratio between said second width and said first width of said transverse groove of said long pitch module is between about 0.8 and about 1.2.

12. The tyre according to claim 1, wherein said short pitch module and said long pitch module comprise respective portions of at least one circumferential groove provided on said tread band.

13. The tyre according to claim 12, wherein said second end of said first transverse groove is adjacent to said circumferential groove.

14. The tyre according to claim 13, wherein said second end is connected to said circumferential groove via a groove with lowered profile, thereby to flatten out substantially completely when in the footprint area.

15. The tyre according to claim 14, wherein said section of enlarged cross-section is connected to said groove with lowered profile by means of an inclined ramp.

16. The tyre according to claim 1, wherein said initial section at said first end of said first transverse groove, has a first inclination with respect to an axial direction of said tread pattern, and said section of enlarged cross-section has a second inclination with respect to said axial direction, said second inclination being greater than said first inclination.

17. The tyre according to claim 16, wherein said first inclination is between about 0° and about 25°.

18. The tyre according to claim 16, wherein said second inclination is between about 45° and about 90°.

19. The tyre according to claim 18, wherein said second inclination is between about 60° and about 80°.

20. The tyre according to claim 1, wherein said initial section comprises a straight portion at said first end, and a curved portion adjacent to said section of enlarged cross-section or to an auxiliary section of said first transverse groove.

21. The tyre according to claim 20, wherein said auxiliary section is interposed between said initial section and said section of enlarged cross-section.

22. The tyre according to claim 20, wherein said initial section at said first end of said first transverse groove, has a first inclination with respect to an axial direction of said tread pattern, and said section of enlarged cross-section has a second inclination with respect to said axial direction, said second inclination being greater than said first inclination, and wherein said straight portion has said first inclination.

23. The tyre according to claim 20, wherein said curved portion of said initial section extends in connection between said straight portion of said initial section and said section of enlarged cross-section or said auxiliary section.

24. The tyre according to claim 1, wherein each of said short pitch module and said long pitch module comprises a second transverse groove extending substantially parallel to, and distanced from, said first transverse groove.

25. The tyre according to claim 24, wherein said first transverse groove and said second transverse groove delimit a first shoulder block of said short pitch module and said long pitch module.

26. The tyre according to claim 24, wherein said first transverse groove and said second transverse groove delimit, at least partially, an elongate raised portion adjacent to said first shoulder block.

27. The tyre according to claim 26, wherein said elongate raised portion extends substantially in a direction parallel to said section of enlarged cross-section.

28. The tyre according to claim 26, wherein said elongate raised portion comprises a plurality of intermediate blocks consecutive to, and substantially aligned with, one another.

29. The tyre according to claim 28, wherein said intermediate blocks are separated by auxiliary transverse grooves.

30. The tyre according to claim 25, wherein each of said short pitch module and said long pitch module comprises a second shoulder block circumferentially aligned with said first shoulder block.

31. The tyre according to claim 30, wherein said second shoulder block of each short pitch or long pitch module is delimited by said second transverse groove and by a first transverse groove of an adjacent short pitch or long pitch module.

32. The tyre according to claim 25, wherein each of said short pitch module and said long pitch module comprises a first sub-module comprising said first shoulder block and said first transverse groove.

33. The tyre according to claim 30, wherein each of said short pitch module and said long pitch module comprises a second sub-module comprising said second shoulder block and said second transverse groove.

34. The tyre according to claim 33, wherein each of said short pitch module and said long pitch module comprises a first sub-module comprising said first shoulder block and said first transverse groove, and wherein said first sub-module and said second sub-module have respective circumferential dimensions selected, independently of one another, from a measurement of short pitch and a measurement of long pitch.

35. The tyre according to claim 1, wherein a void-solid ratio of said short pitch module is substantially identical to a void-solid ratio of said long pitch module.

* * * * *